(12) United States Patent
Butterworth

(10) Patent No.: US 8,393,797 B2
(45) Date of Patent: Mar. 12, 2013

(54) CLOCK WHEEL PIVOT BEARING

(75) Inventor: Mark Butterworth, Muscatine, IA (US)

(73) Assignee: Mark A. Butterworth, Muscatine, IA (US)

( * ) Notice: Subject to any disclaimer, the term of this patent is extended or adjusted under 35 U.S.C. 154(b) by 427 days.

(21) Appl. No.: 12/838,239

(22) Filed: Jul. 16, 2010

(65) Prior Publication Data

US 2012/0014634 A1     Jan. 19, 2012

(51) Int. Cl.
*F16C 43/00*     (2006.01)
*G04B 29/00*     (2006.01)

(52) U.S. Cl. .................................. 384/537; 368/324

(58) Field of Classification Search .................. 384/129, 384/537; 368/322–326
See application file for complete search history.

(56) References Cited

U.S. PATENT DOCUMENTS 3,033,662 A * 5/1962 Ownby et al. ................ 44/337

\* cited by examiner

*Primary Examiner* — Phillip A Johnson

(57) ABSTRACT

Repairs of clocks with worn wheel pivots may be made with a ball bearing pivot wheel support system. The system may utilize a standard sized ball bearing and a bushing in frictional engagement with an inner race of the ball bearing. The bushing may be bored to provide frictional engagement with the pivot wheel so that the pivot wheel may rotate without relative motion between the wheel pivot and the bushing.

8 Claims, 1 Drawing Sheet

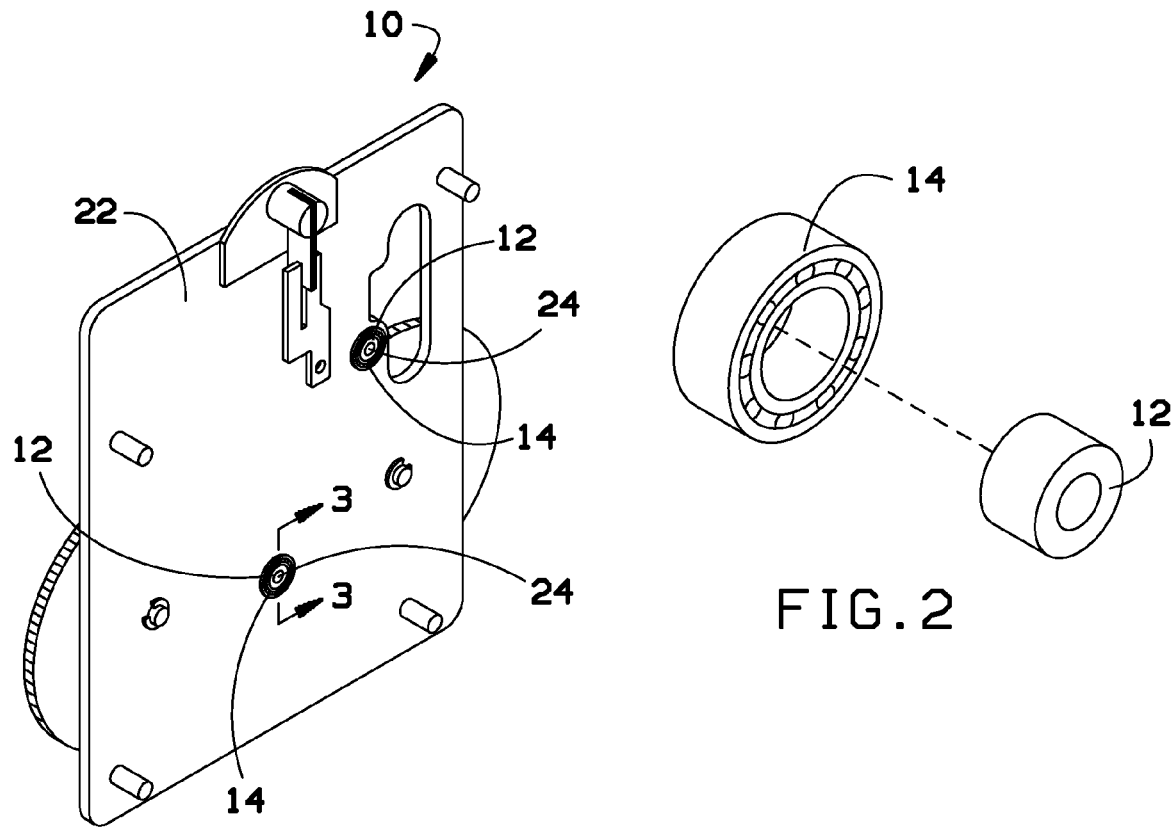
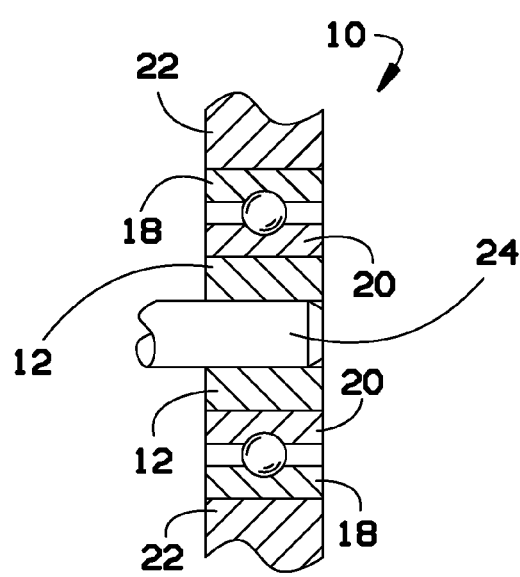

CLOCK WHEEL PIVOT BEARING

BACKGROUND OF THE INVENTION

The present invention generally relates to clock repairs and more particularly to bearings to support clock wheel pivots.

In a typical clock wheel, pivots are supported within pivot holes formed in a support plate. Clock wheel pivots may become dirty and rough over time. This may ruin the pivot holes and may stop the clock.

A standard industry practice for repair of clock wheel pivots involves removing the wheel pivot and boring an enlarged hole in the support plate and inserting a bushing into the hole to provide a new bearing surface for the wheel pivot. The wheel pivot is refinished to remove roughness and is then inserted into the bushing. Such a repair system leaves a clock vulnerable for subsequent wheel pivot failure because the bushing may wear.

As can be seen, there is a need for clock wheel pivot support system that is not subject to failure because of wear between clock wheel pivot a support. There is a further need for a repair system which does not require removing the wheel pivot from the clock.

SUMMARY OF THE INVENTION

In one aspect of the present invention, a pivot wheel support system for a clock may comprise a standard sized ball bearing; a bushing in frictional engagement with an inner race of the ball bearing; and the bushing being bored to provide frictional engagement with a the pivot wheel so that the pivot wheel rotates without relative motion between the wheel pivot and the bushing.

In another aspect of the present invention, a bearing assembly for supporting a wheel pivot of a clock may comprise a standard sized ball bearing; and a bushing frictionally engaged with an inner race of the ball bearing and with the wheel pivot so that the wheel pivot rotates without producing any relative motion between the wheel pivot and the bushing.

In still another aspect of the invention, a method for repairing a clock may comprise the steps of placing a bushing into an inner race of a ball bearing inner; and placing the ball bearing into a support plate so the wheel pivot passes through the bushing.

These and other features, aspects and advantages of the present invention will become better understood with reference to the following drawings, description and claims.

BRIEF DESCRIPTION OF THE DRAWINGS

FIG. 1 is a perspective view of portion of a clock assembly in accordance with an embodiment of the invention;

FIG. 2 is an exploded perspective view of bearing assembly in accordance with an embodiment of the invention; and FIG. 3 is a section view of the bearing assembly of FIG. 2 taken along line 3-3 in FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a clock wheel pivot support assembly constructed with a conventional, standard-sized ball-bearing into which a sizing bushing may be inserted so that a clock wheel pivot with a non-standard diameter may be supported within the ball bearing.

Referring now to the Figures, it may be seen that a portion 10 of a clock may comprise a support plate 22 which may support one or more clock wheel pivots or shafts 24. One or more ball bearings 14 may be positioned in the support plate 22. The ball bearings 14 may be conventional standard-sized ball bearings.

It may be noted that the shaft sizes of the wheel pivots 24 may vary from one clock style to another. A clock repairer may encounter many more possible shaft sizes then there are standard inner-race diameters of standard ball bearings. To address this issue, a sizing bushing 12 may be inserted into an inner race 20 of the ball bearing assembly 14. The bushing 12 may be produced so that it may be frictionally fit into the inner race 20. The bushing 12 may be bored by the repairer so that a particular one of the wheel pivots 24 may fit into and be frictionally engaged with the bushing 12.

Thus repair of one of the worn wheel pivots 24, in accordance with present invention, may be performed by boring a hole in the support plate 22 with a diameter large enough to accommodate an outer race 18 of the ball bearing 14; boring the bushing 12 to frictionally fit the wheel pivot 24; inserting the bushing 12 into the ball bearing 14; and inserting the ball bearing 14 into the support plate 22 to support the wheel pivot 24. It may be noted that such a repair does not require removal of the wheel pivot 24 from a clock. Nor is removal of roughness from the wheel pivot 24 required.

After completion of such a repair, the wheel pivot 24 may rotate without any relative movement between the wheel pivot 24 and the bushing 12. Consequently, a repaired wheel pivot may remain operative for an extended lifetime that may be limited only by the lifetime of the ball bearing 14.

It should be understood, of course, that the foregoing relates to exemplary embodiments of the invention and that modifications may be made without departing from the spirit and scope of the invention as set forth in the following claims.

I claim:

1. A pivot wheel support system for a clock comprising:
   a ball bearing;
   a bushing in frictional engagement with an inner race of the ball bearing; and
   the bushing being bored to provide frictional engagement with the pivot wheel so that the pivot wheel rotates without relative motion between the wheel pivot and the bushing, wherein an outer race of the ball bearing is adapted to frictionally engage with a hole in a support plate of a clock.

2. A bearing assembly for supporting a wheel pivot of a clock comprising:
   a ball bearing; and
   a bushing frictionally engaged with an inner race of the ball bearing and with the wheel pivot so that the wheel pivot rotates without producing any relative motion between the wheel pivot and the bushing.

3. The bearing assembly of claim 2 wherein the ball bearing is a standard sized ball bearing.

4. A method for repairing a clock comprising the steps of:
placing a bushing into an inner race of a ball bearing; and
placing the ball bearing into a support plate so the a wheel pivot passes through the bushing, wherein the pivot wheel is not removed from the clock.

5. The method of claim 4 further comprising the step of boring the support plate so that an outer race of the ball bearing fits in the support plate with frictional engagement.

6. The method of claim 4 further comprising the step of boring the bushing so that the wheel pivot fits in the bushing with frictional engagement.

7. The method of claim 4 further comprising the steps of:
boring the support plate so that an outer race of the ball bearing fits in the support plate with frictional engagement; and
boring the bushing so that the wheel pivot fits in the bushing with frictional engagement.

8. The method of claim 4 wherein roughness is not removed from the wheel pivot.

* * * * *